United States Patent [19]

Brill

[11] 3,727,891
[45] Apr. 17, 1973

[54] APPARATUS AND METHOD FOR MIXING PARTICULATE INGREDIENTS WITH A LIQUID

[75] Inventor: Frank David Brill, Norridge, Ill.

[73] Assignee: The Seeburg Corporation of Delaware, Chicago, Ill.

[22] Filed: Oct. 29, 1970

[21] Appl. No.: 85,144

[52] U.S. Cl. ............259/4, 222/129.1, 222/145
[51] Int. Cl. ............B01f 5/00, B01f 15/02
[58] Field of Search............141/107, 174; 99/289; 259/4, 18, 36, 60; 222/129.4, 133, 135, 136, 145, 129.1

[56] References Cited

UNITED STATES PATENTS

| 3,507,686 | 4/1970 | Hagenbach | 259/4 X |
|---|---|---|---|
| 2,977,026 | 3/1961 | Delgado | 222/129.4 |
| 2,796,893 | 6/1957 | Tamm | 141/100 |
| 2,843,293 | 7/1958 | Burgoyne | 222/129.4 |
| 2,954,145 | 9/1960 | McCauley | 222/129.4 |
| 3,439,717 | 4/1969 | Bode | 141/100 X |
| 3,133,675 | 5/1964 | Broadhurst | 222/129.1 |
| 3,268,119 | 8/1966 | Kopera | 222/129.1 |
| 3,300,094 | 1/1967 | Rockola | 222/129.4 |
| 3,385,569 | 5/1968 | Bookout | 259/60 |
| 3,511,413 | 5/1970 | Fuqua | 222/129.1 |

Primary Examiner—Robert W. Jenkins
Assistant Examiner—Philip R. Coe
Attorney—Ronald L. Engel, Daniel W. Vittum, Jr., Gomer W. Walters and John A. Waters

[57] ABSTRACT

In a system wherein particulate ingredients are added to a liquid through an outlet of a dispenser positioned above the liquid, an air flow is created to cause particles of the ingredients in the vicinity of the outlet of the particulate ingredient dispenser to be passed adjacent to the surface of the liquid and then to be extracted from the system. Mixture of the particulate ingredients and the liquid may be enhanced by forcing the air flow to pass either in close proximity to or through a curtain of the liquid.

19 Claims, 5 Drawing Figures

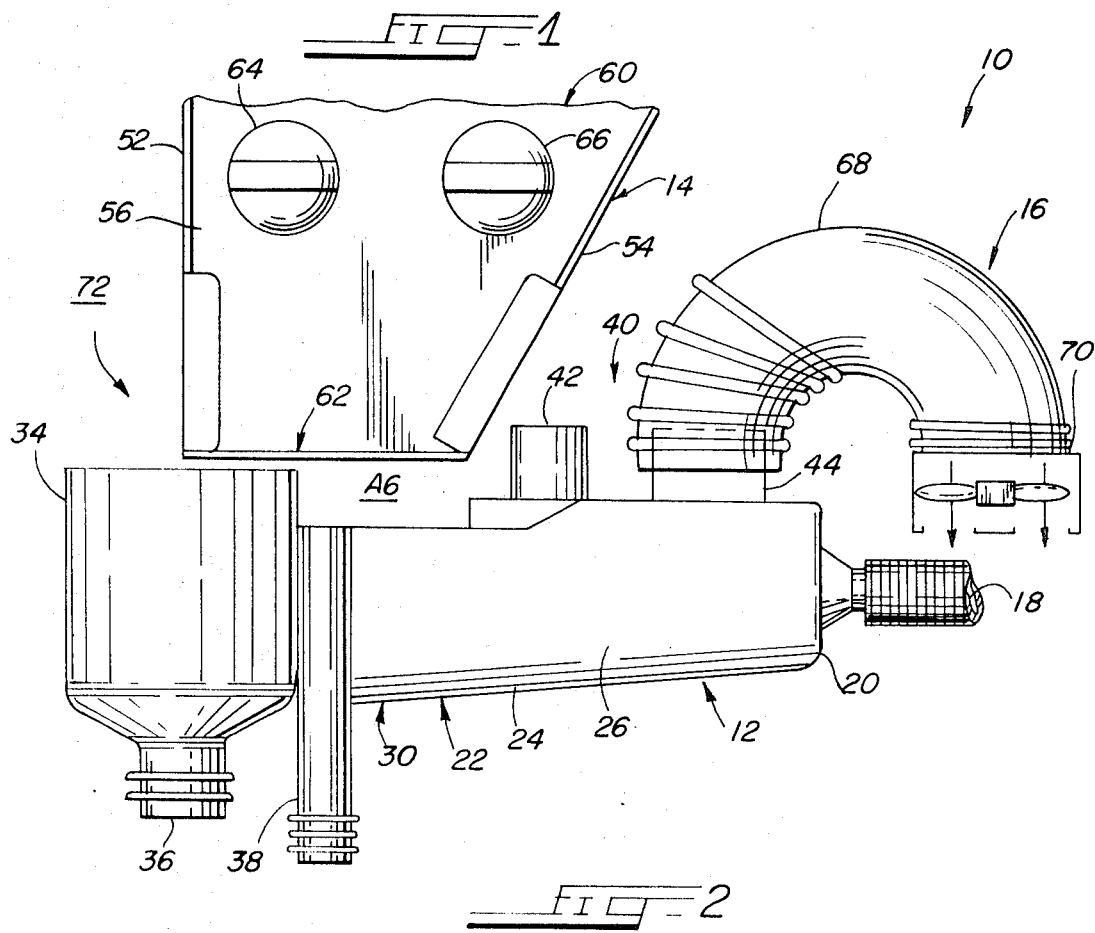
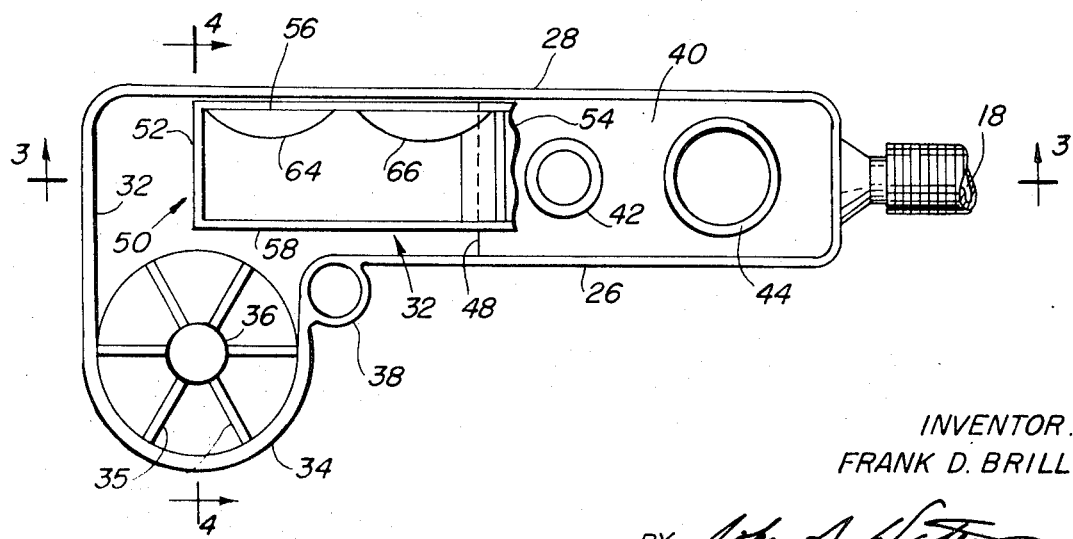
INVENTOR.
FRANK D. BRILL

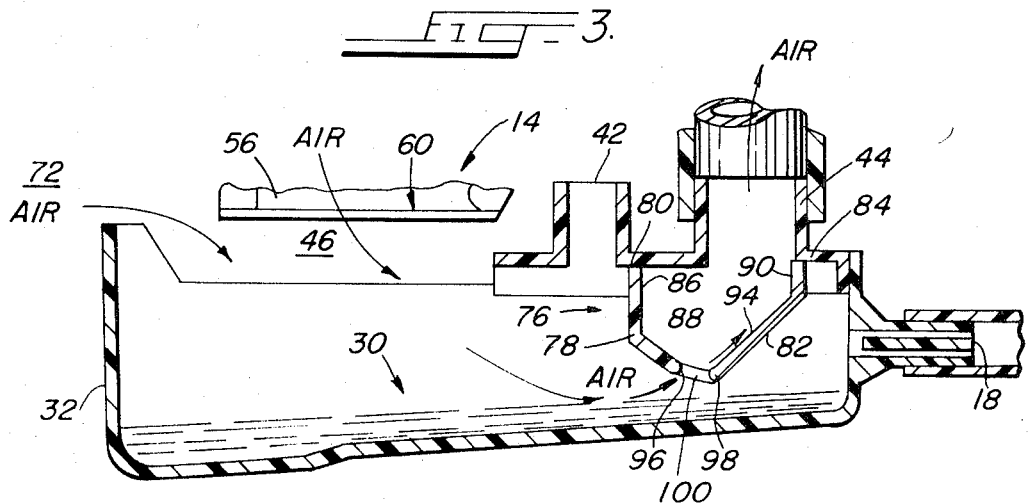
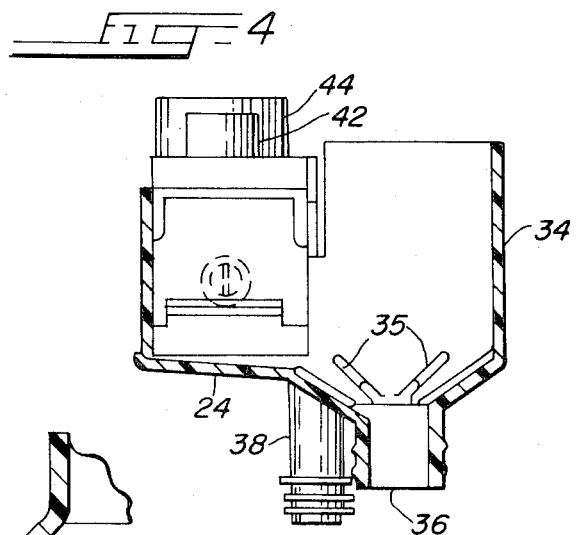
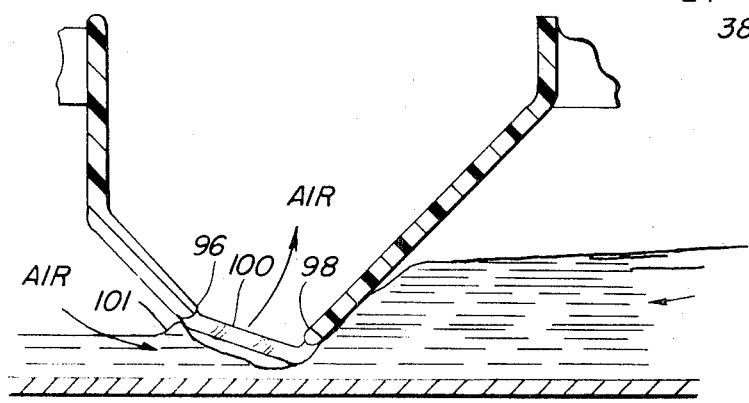
INVENTOR.
FRANK D. BRILL

APPARATUS AND METHOD FOR MIXING PARTICULATE INGREDIENTS WITH A LIQUID

BACKGROUND OF THE INVENTION

1. Field of the Invention

This invention relates generally to an apparatus and a method for mixing particulate ingredients with a liquid, and more particularly, this invention relates to an apparatus and method for eliminating condensation of vaporized liquid on a particulate ingredient outlet in an apparatus for mixing particulate ingredients with a hot liquid.

2. Description of the Prior Art

There are many applications in which particulate ingredients are added to a liquid for admixture therewith. In hot drink vendors, for example, particulate ingredients in the form of powdered cream and sugar are dispensed into hot beverages by discharging the ingredients through outlets positioned above a stream of the hot liquid flowing through a mixing area beneath the outlets, and the powdered ingredients are permitted to drop under the influence of gravity into the flowing liquid for dissolution therein. Turbulence is produced in the mixing area to aid the mixing function.

One of the principal deficiencies of mixing apparatus of the type employed in hot drink vendors is that vaporized liquid (i.e., steam) rising from the hot liquid flowing below the outlet of the powdered ingredient dispenser rises and condenses on the outlet of the powdered ingredient dispenser, thus causing caking of the powdered ingredients on the outlets. This caking is unsanitary and causes the eventual clogging of the powdered ingredient outlets.

SUMMARY OF THE INVENTION

The present invention was evolved in order to obviate condensation of the liquid on the powdered ingredient outlets and to insure that a maximum amount of powdered ingredients dispensed from a powdered ingredient dispenser are admixed properly with the hot liquid in the apparatus.

A method and apparatus for mixing particulate ingredients with a liquid comprises introducing the liquid into a mixing area; dispensing particulate ingredients into the liquid through a dispenser mounted above the mixing area; producing an air flow that causes particulate ingredients to be removed from the vicinity of the dispenser, passed adjacent to the surface of the liquid for deposit therein, and ultimately discharged from the apparatus if not deposited in the liquid.

By forcing the air above the hot liquid to flow in an upstream direction, vaporized liquid (i.e., steam) will be carried away from the outlet of the particulate ingredient dispenser, yet there will be no decrease in the efficiency of the mixing process in the apparatus, because any particulate ingredients entrained in the air will continue to fall into the hot liquid as the air flows upstream from the normal mixing area in the apparatus (i.e., the area beneath the outlet of the particulate ingredient dispenser). The fact that the ingredients will enter the hot liquid at a point upstream of the normal mixing area merely means that the ingredients will have even a greater opportunity for thorough mixture with the hot liquid before the hot liquid leaves the mixing area.

In order to further maximize the mixture of particulate ingredients with the hot liquid, an air flow producing system in the form of an air exhaust system is adapted to cause the air in the immediate vicinity of the particulate ingredient dispenser outlet to flow in a downward direction toward the hot liquid flowing through the mixing trough, so that the downward flow of air will enhance the settling of particulate ingredients in the hot liquid.

The mixture of the particulate ingredients with the hot liquid is further enhanced in the present invention by drawing the air containing the particulate ingredients and hot vaporized liquid past a restriction in the mixing trough, such that the air and particulate ingredients are brought in close proximity to the hot liquid flowing past this restriction. Ideally, the restriction is formed so that a liquid curtain is formed between the restriction and the hot liquid, so that the air and entrained particulate ingredients must pass through the liquid curtain before the air is exhausted from the system.

Several advantages are achieved with the apparatus and method of the present invention. First, moist vaporized liquid is not permitted to condense on the outlets of the particulate ingredient dispenser, thus preventing the moisture from caking the particulate ingredients on the outlet. This improves the cleanliness and sanitation of the apparatus and minimizes malfunctions of the particulate ingredient dispensers through clogging of the outlets. A second major advantage of the present system is that a maximum amount of particulate ingredients dispensed through the particulate ingredient dispenser actually reaches and is deposited in the hot liquid. This feature facilitates the dispensation of accurate and consistent amounts of particulate ingredients into the hot liquid and eliminates waste through unused particulate ingredients.

Yet another advantage of the present invention is that the problem of moisture condensation on the outlet of the particulate ingredient dispenser may be obviated without decreasing the effectiveness of the mixing process in the mixing apparatus. In any apparatus where particulate ingredients are mixed with liquid, thorough admixture of the ingredients with the liquid is always an important feature of the mixing apparatus, so it is desirable to have the particulate ingredients deposited in the hot liquid in a designated mixing area well upstream of the outlet of the mixing apparatus. In the apparatus of the present invention, rather than drawing the air in a downstream direction, which would have caused the particulate ingredients to enter the hot liquid at a point below the normal mixing area, the air is drawn in an upstream direction, so that the particulate ingredients will either enter the hot liquid at the normal mixing area or at a point upstream of the normal mixing area, thereby further enhancing the mixing operation of the apparatus.

Accordingly, it is one of the objects of the present invention to provide an apparatus and method for mixing particulate ingredients with a liquid.

It is another object of the present invention to provide an apparatus and method for mixing particulate ingredients with a hot liquid that eliminates the problem of liquid vapor condensation on the outlet of the particulate ingredient dispenser.

It is a further object of the present invention to provide an apparatus and method for mixing particulate ingredients with hot liquid that maximizes the amount of particulate ingredients dispensed into the hot liquid.

It is yet a further object of the present invention to provide an apparatus and method having the above advantages, wherein the admixture of particulate ingredients with the hot liquid is enhanced.

It is another object of the present invention to provide an apparatus and method for mixing particulate ingredients with a hot liquid, wherein the air above the hot liquid in the mixing apparatus is drawn in an upstream direction away from the outlet of the particulate ingredient dispenser.

These and other objects, advantages, and features of the present invention will hereinafter appear and, for purposes of illustration, but not of limitation, an exemplary embodiment of the subject invention is illustrated in the attached drawing.

BRIEF DESCRIPTION OF THE DRAWINGS

FIG. 1 is a side plan view of the apparatus of the present invention, shown partially in schematic form.

FIG. 2 is a top plan view of the apparatus of the present invention.

FIG. 3 is a cross-sectional view taken along line 3—3 of FIG. 2.

FIG. 4 is a cross-sectional view taken along line 4—4 of FIG. 2.

FIG. 5 is an enlarged large cross-sectional view of a portion of the cross-sectional view shown in FIG. 3.

DESCRIPTION OF THE PREFERRED EMBODIMENT

Referring now to the drawings, a mixing apparatus 10 embodying the present invention is shown in FIGS. 1–5. For exemplary purposes, the apparatus will be described in the form it would take if it were employed in a hot drink vending machine for the dispensation of powdered sugar and cream into hot coffee. It should be understood, however, that the application of the present invention is not limited to a powdered cream and sugar dispenser in a hot coffee machine, but may be employed in any type of system where particulate ingredients are added to a liquid, especially a hot liquid.

Mixing apparatus 10 comprises a longitudinal mixing trough 12, an ingredient dispenser 14 mounted above an open section of the trough 12, and an air flow producing system in the form of an air exhaust system 16 connected to the mixing trough 12 at the upper right hand end thereof (FIG. 1 orientation).

The mixing trough 12 comprises an inlet 18 for liquids, such as hot coffee, at an upstream end 20 thereof. The inlet 18 leads into a longitudinal channel member 22 having a bottom 24 and vertical sides 26 and 28. Liquid admitted through inlet 18 flows past the air exhaust system and into a mixing area 30 beneath the powdered ingredient dispenser 14. After picking up powdered ingredients in the mixing area, the liquid and entrained powdered ingredients flow to the end 32 of the mixing trough and then into a circular turbulence chamber 34, wherein the coffee and powdered ingredients are thoroughly admixed with the aid of beaters 35 before they are dispensed through a hot drink outlet 36. The mixing trough also includes an overflow outlet 38, which is provided for hot drink overflow in case outlet 36 should ever become clogged.

The right hand side of the mixing trough 12 (FIG. 1 orientation) is closed by means of a cover 40. Cover 40 comprises an inlet 42 for tea and an air outlet 44 for extracting air from the system through the air exhaust system 16. Cover 40 fits snugly over channel member 22, so that any air extracted through exhaust system 16 must be drawn in an upstream direction in the mixing trough from an open area 46 above the mixing trough immediately to the left of a left end 48 of the cover. This open area 46 is directly above the mixing area 30 and directly below the powdered ingredient dispenser 14.

Powdered ingredient dispenser 14 comprises a vertically disposed ingredient funnel 50 having a rectangular cross-section. Funnel 50 comprises end plates 52 and 54, a side plate 56 and a cover 58 (removed in FIG. 1) and has an open top 60 and an open bottom 62 disposed over mixing area 30. Mounted on side plate 56 inside the funnel are the outlets of two powdered ingredient dispensers 64 and 66, with outlet 64 being a powdered cream dispenser and outlet 66 being a powdered sugar dispenser. Powdered ingredients dispensed from these outlets are guided by the ingredient funnel through the open bottom 62 thereof and into open area 46 immediately above the mixing area. From there the powdered ingredients fall into the hot liquid as the liquid passes through mixing area 30.

The air exhaust system 16 comprises an outlet tube 68 leading from air outlet 44 to a conventional air exhaust fan 70 (shown in schematic form in FIG. 1). The operation of the air exhaust fan 70 draws air from area 46 through outlet 44 in an upstream direction relative to the direction of flow of liquid through channel 22. The extraction of air from open area 46 in turn causes air to flow in an upstream direction into area 46 from area 72 at the downstream end of the ingredient funnel 50 and causes air to flow in a downward direction into area 46 from area 74 in the ingredient funnel 50.

Referring now to the interior construction of the mixing apparatus, shown in FIGS. 3 and 5, it may be observed that the flow of the air from area 46 to outlet 44 in the cover of the mixing apparatus is partially restricted by means of a restriction 76 extending downwardly from the cover into the mixing trough. Restriction 76 comprises a downstream baffle 78 which is attached along an upper edge 80 to the cover at a point downstream from the air exhaust outlet 44 and an upstream baffle 82, which is attached to the cover along an upper edge 84 at a point upstream of the air exhaust outlet 44. The downstream baffle 78 comprises an upper section 86 that extends vertically downwardly from the cover 80 and a lower section 88 that is sloped in an upstream direction with regard to a vertical axis. Baffle 82 has an upper portion 90 that extends downwardly in a vertical direction from the cover and a lower portion 94 that is sloped in a downstream direction with respect to the vertical axis. Lower portions 88 and 94 of the downstream and upstream baffles, respectively, thus occupy a general V-shaped configuration, with the lower ends 96 and 98, respectively, of the baffles being spaced apart so as to form an opening 100 in the restriction. Opening 100 provides the only means of fluid communication between area 46 of the mixing apparatus and outlet 44 leading to the air exhaust system, so that any air expelled through the air exhaust outlet 44 must pass through opening 100.

In the preferred embodiment of the present invention, lower portions 88 and 94 of baffles 78 and 82, respectively, are each inclined at an angle of approximately 45° with respect to the vertical axis, and end 98 of the upstream baffle extends slightly further into the mixing trough than end 96 of the downstream baffle, so that the plane of the opening 100 faces partially in a downstream direction. In the preferred embodiment of the subject invention, plane 100 is inclined at an angle of about 72° with respect to the vertical axis.

With restriction 76 formed in the manner above-described, several advantages are achieved. First, downstream baffle 78 forces the air in area 46, which contains hot vaporized liquid and powdered ingredients, to pass under lower edge 96 of the baffle before it can pass through opening 100 and out of outlet 44 to the exhaust system. This will bring the powdered ingredients at least in close proximity to the hot liquid and will thus enhance the settling of powdered ingredients in the liquid.

When, however, the quantity and velocity of the hot liquid flowing through inlet 18 is sufficient to raise the liquid level on the upstream side of the restriction to a point above the lower edge 98 of the upstream baffle, the baffle arrangement of the present invention will not only force the air to come in close proximity to the hot liquid flowing through the mixing trough (as shown in FIG. 3), but it will actually force the air to pass through a "curtain" (i.e., a thin sheet) of liquid 101 formed across opening 100 (as shown in FIG. 5). In such a case, virtually all of the powdered ingredients entrained in the air will be deposited in the liquid as the air passes through the water curtain.

Another advantage achieved by the restriction arrangement of the present invention is that the upstream baffle partially restricts the flow of hot liquid from the inlet to the mixing area of the mixing trough, thereby eliminating surges of hot liquid that might otherwise occur in the absence of any restriction in the mixing trough.

Briefly summarizing the operation of the apparatus of the present invention, hot liquid flows into the mixing trough through inlet 18 and passes under restriction 76, through mixing area 30 and into turbulence chamber 34, from which it is dispensed through outlet 36 to a hot drink container. Whenever a customer selects coffee with cream and/or sugar, the powdered ingredients selected are deposited into the ingredient funnel through powdered ingredient outlets 64 and/or 66, respectively. The powdered ingredients then fall downwardly under the force of gravity toward the hot beverage passing through mixing area 30.

As the powdered ingredients are dropping through the funnel, the air exhaust system mounted at the upstream end of the mixing trough draws the air and hot water vapor in area 46 above the mixing area away from the powdered ingredient outlets and out of the apparatus through an exhaust fan 70. This feature eliminates the condensation of water vapor on the powdered ingredient outlets and thereby prevents the caking of powdered ingredients on the powdered ingredient outlets and the clogging of the powdered ingredient dispenser.

The flow of air from area 46 also causes a downdraft of air to occur through the ingredient funnel 50, and this downward flow of air enhances the settling of powdered ingredients in the hot liquid. Any powdered ingredients not deposited in the hot liquid in the mixing area are entrained in the air as it passes in an upstream direction in the mixing trough toward air outlet 44. Most if not all of such entrained powdered ingredients are deposited in the hot liquid as the air is drawn adjacent the liquid in an upstream direction or as the air passes in close proximity to or through a curtain of hot liquid in passing through opening 100 leading to air outlet 44.

The particular advantage of the upstream air flow feature of the present invention is that powdered ingredients (which are necessarily entrained in the air that also contains the hot water vapor being expelled from the apparatus) are not expelled from the apparatus along with the water vapor but are deposited in the hot liquid at a point upstream from the normal powdered ingredient mixing area in the apparatus. By thus insuring that the powdered ingredients are deposited in the hot liquid at least by the time the liquid reaches the mixing area of the apparatus, proper admixture of powdered ingredients and hot liquid will be realized. If, on the other hand, the air were withdrawn from the system in a downstream direction from the powdered dispenser, the powdered ingredients entrained in the air might be introduced in the liquid downstream from the normal mixing area of the apparatus and might not have sufficient time for thorough admixture with the liquid by the time the liquid reached the hot drink outlet of the apparatus.

It should be understood that the embodiment described herein is merely exemplary of the preferred practice of the present invention and that various changes, modifications, and variations may be made in the arrangements, operations, and details of construction of the elements disclosed herein without departing from the spirit and scope of the present invention.

I claim:

1. Apparatus for mixing particulate ingredients with a liquid comprising:

a longitudinal mixing area having an upstream end and a downstream end;

conveying means adapted to introduce liquid into the mixing area at the upstream end thereof, convey the liquid through the mixing area in a longitudinal path, and discharge the liquid from the mixing area at the downstream end thereof;

particulate ingredient dispensing means mounted above said mixing area, said dispensing means being adapted to dispense particulate ingredients into the liquid in the mixing area; and air flow producing means adapted to cause the air above the mixing area and any particulate ingredients entrained therein to be removed from the vicinity of said dispensing means and passed in an upstream direction relative to the direction of flow of liquid through the mixing area, whereby any vaporized liquid rising into the air from the liquid is removed from the vicinity of the particulate ingredient dispensing means and mixing of the particulate ingredients in the liquid is maximized.

2. Apparatus as claimed in claim 1 wherein said air flow producing means is adapted to cause air in the area of the particulate ingredient dispensing means to flow downwardly toward the liquid in said mixing area, whereby settling of particulate ingredients in the liquid is enhanced.

3. Apparatus as claimed in claim 2 wherein:
said particulate ingredient dispensing means comprises a hollow, vertically disposed ingredient funnel mounted above said mixing area, said funnel having an open top and an open bottom;
an outlet from said particulate ingredient dispensing means is mounted in said funnel between the open top and bottom thereof; and
said air flow producing means causes air to flow in a downward direction through said funnel toward the liquid flowing through said mixing area beneath said funnel.

4. Apparatus for mixing particulate ingredients with a hot liquid comprising:
a longitudinal trough having an inlet for hot liquid at an upstream end thereof and an outlet for a mixture of hot liquid and admixed particulate ingredients at a downstream end thereof;
a particulate ingredient dispensing means mounted above the trough at a point between the two ends thereof, said dispensing means being adapted to dispense particulate ingredients from at least one outlet into the hot liquid flowing through the trough;
air exhaust means adapted to cause the air above the hot liquid in the mixing trough to flow in an upstream direction relative to the direction of flow of the hot liquid in the mixing trough;
whereby vaporized liquid rising into the air from the hot liquid will not condense on the ingredient dispensing means but will be drawn in an upstream direction away from the ingredient dispensing means along with the air.

5. Apparatus as claimed in claim 4 wherein:
said mixing trough comprises a cover enclosing the portion of said mixing trough extending from the upstream end thereof to said particulate ingredient dispensing means; and
said exhaust means comprises an exhaust fan that draws air through an air outlet in the enclosed portion of said mixing trough upstream of said particulate ingredient dispensing apparatus.

6. Apparatus as claimed in claim 5 and further comprising restriction means positioned in the enclosed portion of said mixing trough at least partially between said particulate ingredient dispensing means and the air outlet, said restriction means being adapted to restrict the flow of air to the air outlet such that the air and any particulate ingredients entrained therein come in close proximity to the hot liquid in said trough before the air passes out the outlet, whereby at least the major portion of the powdered ingredients entrained in the air stream are deposited in the hot liquid.

7. Apparatus as claimed in claim 6 wherein said restriction means is further adapted to partially restrict the flow of hot liquid from the inlet to the outlet of said mixing trough, thereby preventing hot liquid from surging through said mixing trough.

8. Apparatus as claimed in claim 7 wherein said restriction means is formed so that the flow of hot liquid past said restriction means forms a liquid curtain that the air must flow through in order to reach the air outlet.

9. Apparatus as claimed in claim 8 wherein the air outlet is located in said cover and said restriction means is a baffle arrangement comprising:
a transverse upstream baffle attached along an upper edge thereof to said cover upstream from the air outlet and extending from said cover downwardly into said mixing trough to a lower edge adjacent the bottom of said mixing trough; and
a transverse downstream baffle attached along an upper edge thereof to said cover downstream from the air outlet and extending from said cover downwardly into said mixing trough to a lower edge adjacent the bottom of said mixing trough, the lower edge of said downstream baffle being positioned relative to the lower edge of said upstream baffle so that an opening is formed between the lower edges of said baffles,
whereby air flowing in an upstream direction in said mixing trough must pass below the lower edge of said downstream baffle and through the opening in order to reach the air outlet, and hot liquid passing in a downstream direction from the inlet in said mixing trough must pass below the lower edges of both baffles in order to reach the mixing trough outlet.

10. Apparatus as claimed in claim 9 wherein:
said baffles each comprise lower portions that are sloped with respect to the vertical axis such that the lower end of said restricting means has a generally V-shaped cross-section; and
the lower edge of said upstream baffle extends further into said mixing trough than the lower edge of said downstream baffle, so that the plane of the opening formed between the lower edges of said baffles faces partially in a downstream direction.

11. Apparatus as claimed in claim 10 wherein the lower portions of said baffles are sloped at an angle of about 45° with respect to a vertical axis and the plane of the opening between the lower edges of the baffles is sloped at an angle of about 72° with respect to a vertical axis.

12. Apparatus as claimed in claim 9 wherein said baffles are formed so that hot liquid passing by said baffles from the inlet in the mixing trough comes in contact with said upper baffle and forms a liquid curtain across the opening between the lower ends of said baffles, whereby air flowing upstream in said mixing trough must flow through the liquid curtain in order to be expelled from said mixing trough through the air outlet.

13. Apparatus for mixing powdered ingredients with a hot liquid comprising:
a longitudinal mixing trough having an inlet for hot liquid at an upstream end thereof and an outlet for a mixture of hot liquid and admixed powdered ingredients at a downstream end thereof, said mixing trough having a mixing area therein, which is positioned between the two ends thereof;
powdered ingredient dispensing means mounted above said mixing area, said dispensing means being adapted to dispense powdered ingredients from at least one outlet, through an ingredient funnel, and into the hot liquid as it flows through the mixing area;

a cover enclosing the portion of said mixing trough upstream from the mixing area, said cover comprising a restriction extending into said mixing trough from the underside of said cover and an air outlet upstream from said restriction, such that the expulsion of air from the apparatus through said air outlet causes air above the mixing area to flow in an upstream direction relative to the direction of flow of the hot liquid in said mixing trough and causes the air to flow past said restriction in said mixing trough in close proximity to the hot liquid before it can pass through said air outlet; and air exhaust means adapted to draw air through said air outlet of said cover and expel air from the apparatus, whereby condensation of vaporized liquid on said ingredient dispensing means is minimized, the mixing of particulate ingredients in the liquid is maximized, and unmixed particles of the ingredients and vaporized liquid are removed from the apparatus.

14. A process for mixing particulate ingredients with a liquid comprising:

introducing liquid into a mixing area at an upstream end thereof;

conveying the liquid in a longitudinal path through the mixing area and out of the mixing area at a downstream end thereof;

dispensing the particulate ingredients from an outlet positioned above said mixing area and allowing the particulate ingredients to drop into the liquid;

producing an air flow above said mixing area such that particles of the ingredients dispensed from said outlet will be removed from the vicinity of said outlet, passed adjacent the surface of the liquid for deposit therein in an upstream direction relative to the direction of flow of liquid through the mixing area, and ultimately removed from the system if not deposited in the liquid, whereby mixing of the particulate ingredients in the liquid is maximized and unmixed particles of the ingredients are removed from the system.

15. A process as claimed in claim 14 wherein the air above said mixing area also is caused to flow in a downward direction from the outlet toward the liquid, thereby enhancing the settling of particulate ingredients in the liquid.

16. A process for mixing particulate ingredients with a hot liquid comprising:

conveying a stream of hot liquid through a mixing area along a longitudinal path from an inlet at an upstream end thereof to an outlet at a downstream end thereof;

dispensing the particulate ingredients from an outlet into the air above the said stream of hot liquid and allowing the particulate ingredients to drop into the liquid;

drawing the air between said stream of hot liquid and said outlet away from said outlet and in a direction upstream from the direction of flow of the hot liquid, whereby vaporized liquid contained in the air will be drawn away from said outlet and condensation of liquid on the outlet will be avoided.

17. A process as claimed in claim 16 and further comprising causing the air between said outlet and said stream of hot liquid to flow in a downward direction toward the hot liquid, thereby enhancing the settling of particulate ingredients into the liquid while avoiding condensation of vaporized liquid on said outlet.

18. A process as claimed in claim 17 wherein the air containing vaporized liquid and particulate ingredients passing in an upstream direction is brought in close proximity to said stream of hot liquid at a point upstream from said outlet for particulate ingredients so as to maximize the amount of particulate ingredients coming in contact with the liquid for admixture therewith.

19. A process as claimed in claim 18 wherein the air containing vaporized liquid and particulate ingredients is passed through a liquid curtain formed between said stream of hot liquid and a restriction positioned above said stream of hot liquid.

* * * * *